April 6, 1965    J. P. LABRECQUE ETAL    3,176,937
EMERGENCY FLOTATION GEAR
Filed Sept. 7, 1962    2 Sheets-Sheet 1
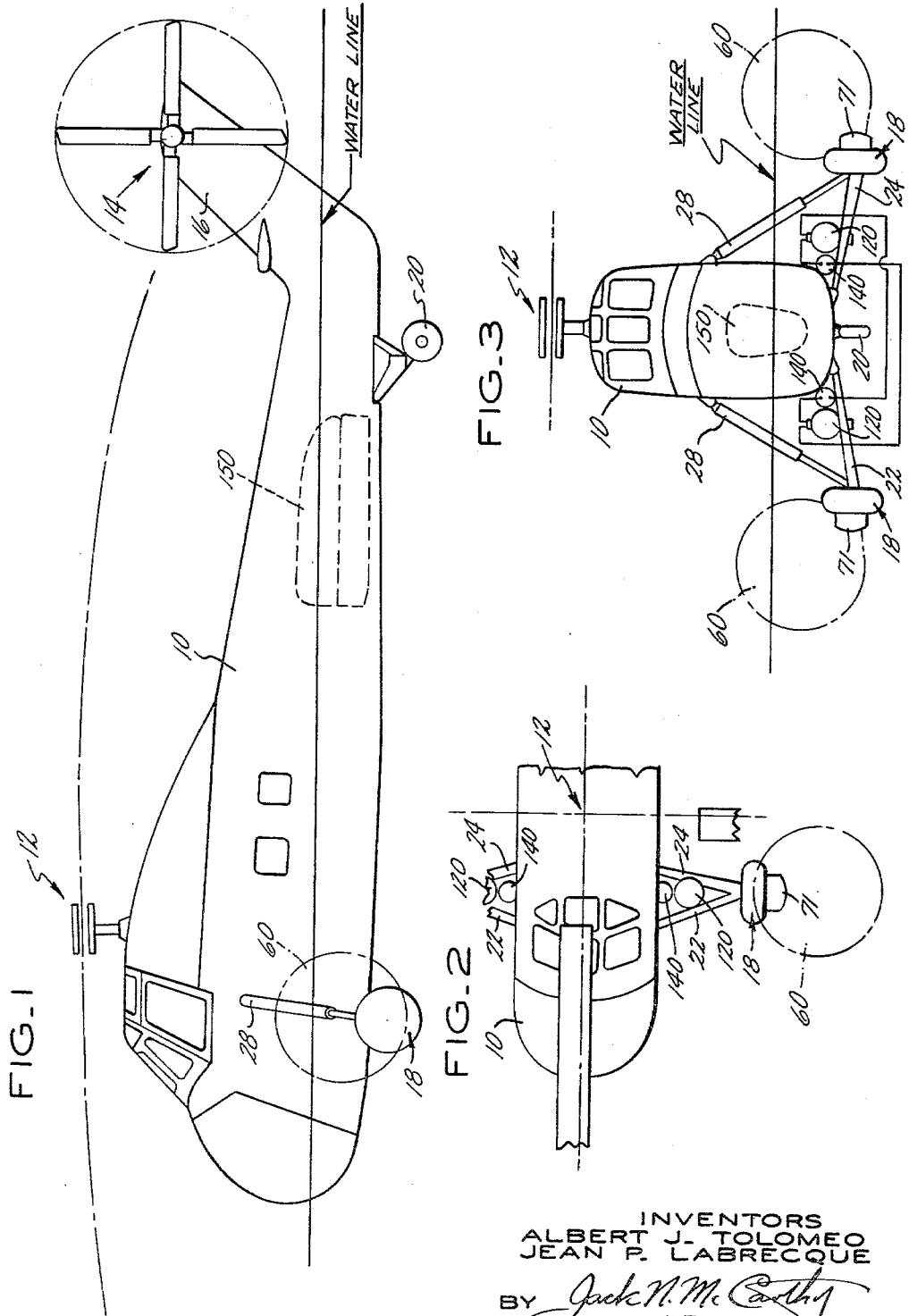
INVENTORS
ALBERT J. TOLOMEO
JEAN P. LABRECQUE
BY Jack N. McCarthy
AGENT

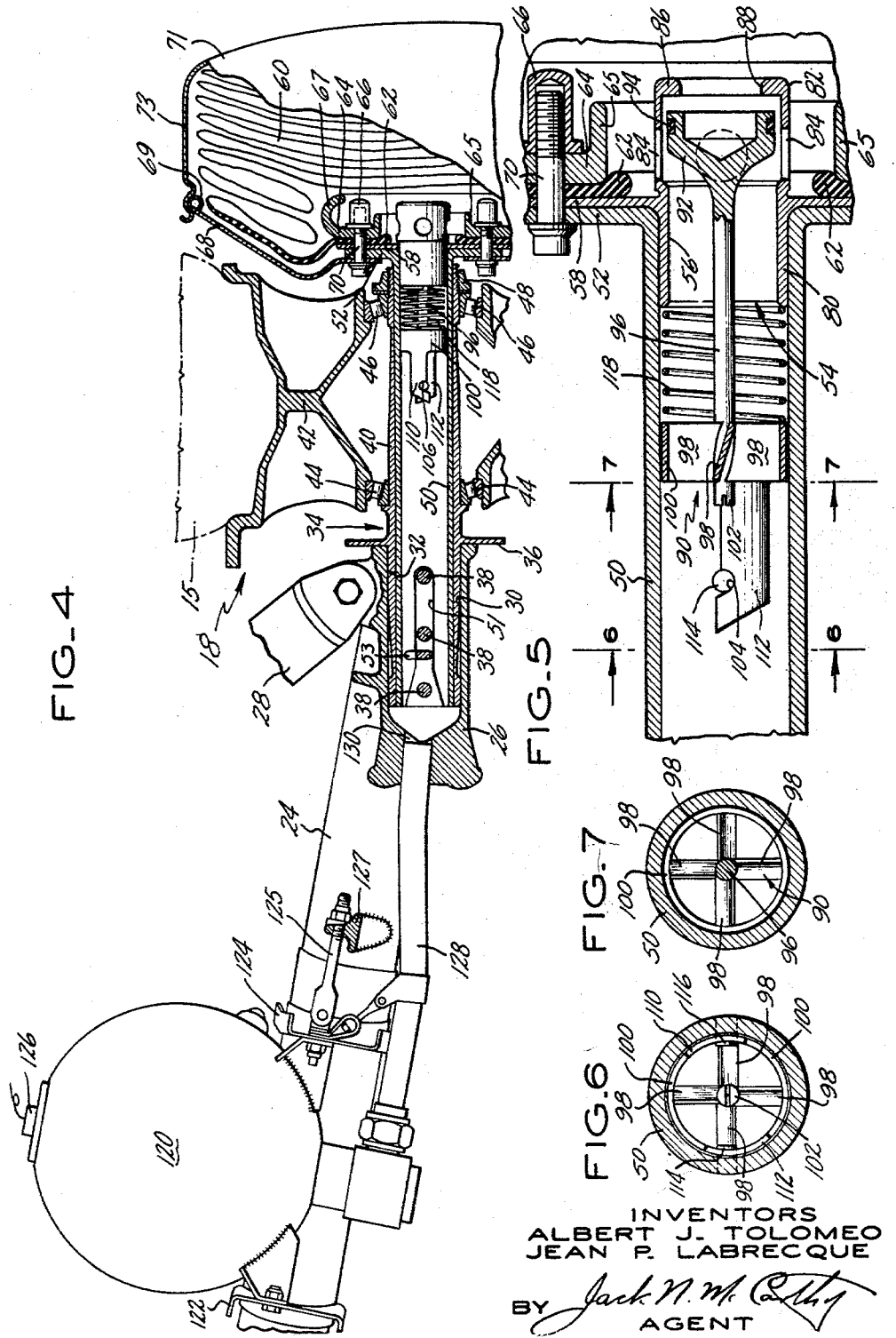
April 6, 1965  J. P. LABRECQUE ETAL  3,176,937
EMERGENCY FLOTATION GEAR
Filed Sept. 7, 1962  2 Sheets-Sheet 2
INVENTORS
ALBERT J. TOLOMEO
JEAN P. LABRECQUE
BY Jack N. McCarty
AGENT United States Patent Office 3,176,937
Patented Apr. 6, 1965

3,176,937
EMERGENCY FLOTATION GEAR
Jean P. Labrecque, Monroe, and Albert J. Tolomeo, Stratford, Conn., assignors to United Aircraft Corporation, East Hartford, Conn., a corporation of Delaware
Filed Sept. 7, 1962, Ser. No. 222,001
14 Claims. (Cl. 244—107)

This invention relates to emergency flotation apparatus for a helicopter.

An object of this invention is to provide a permanently inflated float situated within the tailcone section and a float housed and packed within the hub area of each main wheel.

A further object of this invention is to provide an emergency flotation apparatus which will reduce the weight of such systems to a minimum.

Another object of this invention is to provide each main wheel with a flotation unit which can be easily installed or removed.

A further object of this invention is to provide each main wheel with an enlarged hub including a deflated float bag which can be inserted into the axle of a wheel or removed therefrom by a single release device.

Another object of this invention is to provide a valve within the tube adapted to be inserted within the axle which is held partially open during ordinary flight of the aircraft to permit the interior of the deflated bag to be vented.

A further object of this invention is to provide a valve located in the tube adapted to be inserted into the axle of a wheel which will be fully opened upon the initiation of a gas flow into the deflated bag and which will be permitted to close when the flow into said bag has ceased.

Another object of this invention is to provide an automatic device for initiating gas flow into the deflated floats or bags when required.

These and other objects and advantages will be apparent from the specification and claims and from the accompanying drawings which illustrate an embodiment of the invention.

FIGURE 1 is a side elevation of a helicopter showing the location of the permanently inflated float within the tail cone and the approximate position of the front wheel floats when inflated and supporting the aircraft;

FIGURE 2 is a top view of a front portion of the aircraft of FIGURE 1;

FIGURE 3 is a front view of the aircraft, shown in FIGURE 1, with the actuating device shown connected to the gas generators;

FIGURE 4 is an enlarged view of a portion of the landing gear showing the gas generator and showing the wheel portion of the float connection in section;

FIGURE 5 is an enlarged view of the valve mechanism located in the tube provided for insertion into the axle;

FIGURE 6 is a view taken along the line 6—6 of FIGURE 5; and

FIGURE 7 is a view taken along the line 7—7 of FIGURE 5.

Referring to FIGURE 1, a helicopter is shown having an extended fuselage 10, a single main sustaining rotor 12, and a torque-compensating rotor 14, mounted on an upwardly extending pylon 16. The landing gear includes two main forward wheels 18 and a tail wheel 20.

The mounting for each main forward wheel 18 comprises two struts 22 and 24 which extend outwardly from spaced positions on the helicopter fuselage. The outer ends of the struts are fixed to either side of an axle receiving member 26 to form a V. The struts 22 and 24 are pivotally mounted to the helicopter to provide for angular movement permitted by the main oleo struts 28 which extend downwardly from the side of the helicopter to a point on the axle receiving member just above the connections of the struts 22 and 24. While a specific means has been described fixing the axle holding member 26 in position, other desired means can be used. Some aircraft have only one strut extending to the main oleo strut.

The axle holding member 26 is formed having a cylindrical bore 30 for receiving the tubular section 32 of an axle 34. A flange 36 on the axle 34 abuts the outer end of the axle holding member 26. Three bolts 38 pass through the axle holding member 36 and axle 32 for fixing the two elements together. A tubular portion 40 of the axle extending outwardly from the flange 36 has a wheel 42 mounted thereon on bearings 44 and 46. The inner bearing 44 is positioned against an annular abutment on the axle portion 40 and the outer bearing 46 is positioned against a lock-nut device 48. The tire 50 is schematically shown.

The emergency flotation apparatus includes two main parts. These parts are:
 (1) The hub flotation unit, and
 (2) The gas generating mechanism including means for actuating it.

The hub flotation unit includes a cylindrical tube 50 which is adapted to project into the axle 34. The end of the tube projecting into the axle has cut out portions 51 to permit the tube to slide by the bolts 38. The tube 50 is fixed in the axle by a pin 53 which extends through a hole drilled through the axle holding member 26, axle 32, and tube 50. The outer end of said cylindrical tube is formed having an annular flange 52 which is spaced outwardly from the wheel. A valve mechanism 54 is positioned in the outer end of the cylindrical tube 50. This valve mechanism includes a part 56 which is fixed in position by an integral flange 58 which is located adjacent the outer end of the annular flange 52. The deflated bag 60 has its reinforced gas inlet 62 placed about the flange 58. A washer 64, formed from two halves, and having a plurality of nuts 66 fixed thereto, is placed within the deflated bag and around the reinforced gas inlet. An annular plate 68 is placed with its inner circumference abutting the inside of the annular flange 52. This element 68, along with annular flange 52, integral flange member 58, the reinforced portion 62 around the gas inlet of the deflated bag, and both halves of the washer 64, are held together by bolts 70 which pass through all of these elements. All of these elements have holes which are axially aligned so that the bolts can project therethrough and engage the nut 66 fixed on each half of the washer 64. Washer 64, in position, presents an annular deflector flange 65 which projects into the bag for a purpose to be hereinafter described. The outer edge of the washer has an annular flange 67 of a semi-circular cross section to protect the bag from being torn on the edge of a straight washer or on a nut 66.

Element 68 extends radially from its bolted portion to its outer circular edge which is formed as a bead 69. A cap 71 encloses the deflated bag 60 and is spring held against the bead 69. This can be done by having the sides 73 of the cap formed as leaf springs to grip the bead 69.

Part 56 of the valve mechanism has a cylindrical portion 80 which extends into the end of the cylindrical tube 50 and a cylindrical portion 82 which extends into the gas inlet 62 of the bag. This portion 82 is formed having openings 84 around the side of the cylinder and the end of the cylinder is formed having a lip 86 extending inwardly forming an opening 88. Openings 84 are spaced from the flange 65 so that the force of the gas passing therethrough is first taken by the flange. The inner cylindrical surface of cylindrical portion 82 is larger than the inner cylindrical surface of part of cylindrical portion 80.

The valve mechanism also includes a movable part 90 which includes a piston valve 92 which is adapted to cooperate with the inner surface of portion 80 serving as a valve seat. A piston ring 94, formed in the annular surface of the valve piston 92, aids in sealing. A valve stem 96 extends from the valve piston 92 into the tube 50. At the end of the valve stem, four vanes are fixed thereto which extend to an annular member 100 which is adapted to slide within the cylindrical tube 50. A notch 102 is provided in the end of the valve stem for a purpose to be hereinafter disclosed.

Two projections 110 and 112 extend into the cylindrical tube 50 from the annular member 100, each being contoured to the inner surface of the cylindrical tube 50. These projections are formed each having a stud receiving notch 104 and 106, respectively, for engaging a cooperating projecting stud on the inner side of tube 50. Notch 104 engages a stud 114 and notch 106 engages a stud 116. A spring 118 holds the notches engaged when the piston valve 92 is positioned in its partially open position. In this position, the interior of the bag is vented to the inside of tube 50 and bore 30 of the axle receiving member. The inside of the tube 50 and bore 30 is in turn vented to atmosphere by ordinary tolerances in the parts. If necessary, a vent hole can be provided.

The bottom of each notch is formed as a cam to aid in rotating the movable part 90 to disconnect each notch from its stud when the part 90 is moved axially. The vanes 98 are placed at an angle to give an axial and rotative movement to part 90 when gas flow passes thereby.

The gas generating mechanism for each hub flotation unit includes a gas generator 120. This unit can be either a carbon dioxide or pyrotechnic-type cool gas generator. However, any other type can be used if it can provide the desired inflation as a self-contained unit. The gas generator provides firm inflation in a short period of time and maintains a gas temperature well below bag withstanding capability under all conditions. The gas generator 120 is held in position by attached brackets 122 and 124 which are held between the cooperating struts 22 and 24 by a link 125. This link draws the ends of the brackets 122 and 124, which are contoured and of such a length to engage the struts as they form a V, against the struts and is fixed to a cross member 127 extending between the struts and affixed thereto.

A device 126 for initiating gas flow from the gas generator is attached to the gas generator. A conduit 128 extends between the gas generator 120 and an opening 130 which extends from the cylindrical bore 30 to the inwardly facing end of the axle holding member 26. This conduit 128 is slidably positioned in opening 130 and is fixedly secured at one end to the gas generator 120 and at an intermediate point to the bracket 124. A submersion actuator 140 is located on each bracket 122 at a point mounted inwardly towards the aircraft from the gas generator located on that side. Each actuator is connected to both devices 126. This is done so that either submersion actuator 140 will inflate both bags 60. While the actuator 140 has been shown mounted on the bracket 122, other locations desired may be used.

While this forward inflation means is provided, a permanently inflated float 150 is provided in the tail section to hold up the tail cone.

OPERATION

When an aircraft incorporating this device makes an emergency landing in water, the first submersion actuator to be submerged actuates both devices 126 and thereby connects each gas generator 120 to its respective hub flotation unit. As the gas flows through each tube 50, it engages the vanes 98 which rotates the movable part 90 of the valve mechanism while placing it in its full open position allowing a full open passage to the bag. As the bag starts to inflate, the hub 71 is ejected from its position located on element 68. This rotation unlatches the pair of notches 104 and 106 from their respective studs 114 and 116 so that when each bag is inflated, and gas flow ceased, the movable part 90 will be biased to a position which will locate the piston valve 92 within the cylindrical portion 80 of the part 56 of the valve mechanism to prevent gas flowing from the bag. In this position, the spring biases the annular ring 100 towards the studs 114 and 116.

To deflate a bag, the pin 53 is removed and the hub flotation unit is removed from the axle. A long handle screwdriver can then be placed in the tube 50 to engage the notch 102. When the notch has been engaged, the screwdriver can move the movable part of the valve mechanism to a position opening the valve and then rotate the movable part so that the notches 104 and 106 can be latched with the studs 114 and 116, respectively.

It is to be understood that the invention is not limited to the specific description above or to the specific figures, but may be used in other ways without departure from its spirit as defined by the following claims.

We claim:
1. In combination on an aircraft:
 (a) a landing gear,
 (b) said landing gear including a wheel mounted on an axle,
 (c) means supporting said axle,
 (d) said axle having a bore therein,
 (e) a releasable emergency flotation unit,
 (f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means including a latch mechanism for holding said valve means in an intermediate open position,
  (7) dynamic means responsive to a flow of fluid through said valve disabling said latch, and
 (g) means for directing gas into the tube.
2. In combination on an aircraft:
 (a) a landing gear,
 (b) said landing gear including a wheel mounted on an axle,
 (c) means supporting said axle,
 (d) said axle having a bore therein,
 (e) a releasable emergency flotation unit,
 (f) said emergency flotation unit comprising:
  (1) a tube releasably fixed in said bore,
  (2) a deflated bag connected to the end of said tube having an opening,
  (3) said opening being placed around the end of the tube to direct a flow of gas thereinto,
  (4) a hub enclosing said bag,
  (5) said hub being releasably attached to said tube,
  (6) valve means in said tube for maintaining gas in said bag positioned in an intermediate partially open position,
  (7) means for moving said valve means from its intermediate position to full open upon gas flow passing through said tube into said bag and permitting said valve means to close to prevent gas from escaping from said bag, and
 (g) means for directing gas into the tube.
3. In combination on an aircraft:
 (a) a landing gear,
 (b) said landing gear including a wheel mounted on an axle,

(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube positioned in an intermediate partially open position having an outlet in said bag,
  (6) means for moving said valve means from its intermediate position to full open upon gas flow passing through said tube into said bag and permitting said valve means to close to prevent gas from escaping from said bag,
  (7) a deflector positioned around said outlet to receive the direct flow from said valve means, and
(g) means for directing gas into the tube.

4. In combination on an aircraft:
(a) a landing gear,
(b) said landing gear including a wheel mounted on a short axle,
(c) means supporting said axle,
(d) said axle having a cylindrical bore therethrough,
(e) an emergency flotation unit,
(f) said emergency flotation unit comprising:
  (1) a cylindrical tube fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) a valve in said tube positioned in an intermediate partially open position,
  (6) means for moving said valve from its intermediate position to full open upon gas flow passing through said tube into said bag and permitting said valve to close to prevent gas from escaping from said bag, and
(g) means for directing gas into the cylindrical tube.

5. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) said valve means in said tube,
  (6) said valve means comprising:
    (a) a housing formed as a tube,
    (b) a valve piston reciprocable in said tube between an open and closed position,
    (c) spring means biasing said piston to its closed position,
    (d) said valve piston being held in an intermediate open position,
  (7) valve positioning means in said tube for determining the open position of the valve piston before the bag is inflated,
  (8) said piston being actuated by the flow of gas through said tube, and
(g) means for directing gas into the cylindrical tube.

6. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube,
  (6) said valve means being open when said bag is deflated and closed when said bag is inflated,
(g) means for directing gas into the tube for inflating said bag.

7. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube, and
  (7) said valve means including a latch mechanism for holding said valve means in an intermediate open position,
(g) means releasably fixed to said supporting means for directing gas into the tube for inflating said bag.

8. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube,
  (7) said valve means including a latch mechanism for holding said valve means in an intermediate open position,
(g) means for directing gas into the tube,
(h) said means for directing gas into the tube comprising:
  (1) a gas generator,
  (2) a conduit means connected between said gas generator and the bore of said axle.

9. In combination on an aircraft:
(a) a landing gear, (b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube, and
  (7) said valve means comprising:
    (a) a tubular housing having an inlet and outlet,
    (b) a valve piston movable in said housing between an open and closed position.,
(g) means for directing gas into the tube.
10. In combination on an aircraft:
(a) a landing gear,
(b) said landing gear including a wheel mounted on an axle,
(c) means supporting said axle,
(d) said axle having a bore therein,
(e) an emergency flotation unit,
(f) said emergency flotation unit comprising:
  (1) a tube fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube, and
  (7) said valve means comprising:
    (a) a tubular housing having an inlet and outlet,
    (b) a valve piston movable in said housing between an open and closed position,
    (c) means for releasably positioning the valve piston in a partially open position to vent the deflated bag,
    (d) a rod extending from said valve piston into said tube,
    (e) vanes in said tube projecting from said rod,
    (f) said vanes move said valve piston to its full open position when gas impinges thereon,
    (g) said vanes are placed at an angle so that the means for positioning said valve piston is released to permit said valve piston to move to a closed position when gas ceases to flow in the tube, and
(g) means for directing gas into the tube.
11. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube.
(g) means for directing gas into the tube,
(h) said means for directing gas into the tube comprising:
  (1) a gas generator,
  (2) conduit means connected between said gas generator and the bore of said axle,
  (3) means releasably connecting said gas generator and conduit means to said means supporting said axle.
12. In combination on an aircraft:
(a) a landing gear,
(b) said landing gear including a wheel mounted on an axle,
(c) means supporting said axle,
(d) said axle having a bore therein,
(e) a releasable emergency flotation unit,
(f) said emergency flotation unit comprising:
  (1) a tube releasably fixed in said bore,
  (2) a deflated bag connected to the end of said tube so that the tube is adapted to direct a flow of gas thereinto,
  (3) a hub enclosing said bag,
  (4) said hub being releasably attached to said tube,
  (5) valve means in said tube for maintaining gas in said bag,
  (6) said valve means being actuated by the flow of gas through said tube.
(g) means for directing gas into the tube,
(h) said means for directing gas into the tube comprising:
  (1) a gas generator,
  (2) conduit means connected between said gas generator and the bore of said axle,
  (3) means releasably connecting said gas generator and conduit means to said means supporting said axle,
  (4) a submersion actuator for starting said gas generator.
13. An emergency flotation unit comprising:
(a) a tube adapted to be releasably fixed in a bore,
(b) a deflated bag fixedly connected to the end of said tube so that the tube is adapted to direct a flow of gas thereinto,
(c) a hub enclosing said bag,
(d) said hub being releasably attached to said tube,
(e) valve means in said tube,
(f) said valve means comprising:
  (1) a housing formed as a tube,
  (2) a valve member reciprocable in said tube between an open and closed position,
  (3) spring means biasing said member to its closed position,
  (4) latch means for holding said member in a partially open position,
(g) said member being actuated by the flow of a gas through said tube.
14. An emergency flotation unit comprising:
(a) a tube adapted to be releasably fixed in a bore,
(b) a deflated bag fixedly connected to the end of said tube so that the tube is adapted to direct a flow of gas thereinto,
(c) a hub enclosing said bag,
(d) said hub being releasably attached to said tube,
(e) valve means in said tube,
(f) said valve means comprising:
  (1) a housing formed as a tube,
  (2) a valve member reciprocable in said tube between an open and closed position, (3) spring means biasing said member to its closed position,
(4) latch means for holding said member in a partially open position,
(5) vanes connected to said latch means to open said latch when gas is impinged thereon to place said latch means in a position to permit said member to move to a closed position when the spring means actuates said member,
(g) said member being actuated by the flow of a gas through said tube.

References Cited by the Examiner
UNITED STATES PATENTS

| | | | |
|---|---|---|---|
| 1,973,007 | 9/34 | Martin | 244—101 |
| 2,439,118 | 4/48 | Waterman | 137—460 X |
| 2,621,874 | 12/52 | Boyle | 244—105 X |
| 2,903,718 | 9/59 | Wright | 9—316 X |
| 3,001,546 | 9/61 | Salisbury | 137—541 |

MILTON BUCHLER, *Primary Examiner.*